(12) United States Patent
Kim

(10) Patent No.: US 8,616,660 B2
(45) Date of Patent: Dec. 31, 2013

(54) REGENERATIVE BRAKE CONTROL METHOD

(75) Inventor: Sang Mook Kim, Gyeonggi-do (KR)

(73) Assignee: MANDO Corporation, Pyeongtaek-si, Gyeonggi-do (KR)

(*) Notice: Subject to any disclaimer, the term of this patent is extended or adjusted under 35 U.S.C. 154(b) by 259 days.

(21) Appl. No.: 13/105,657

(22) Filed: May 11, 2011

(65) Prior Publication Data

US 2011/0278913 A1 Nov. 17, 2011

(30) Foreign Application Priority Data

May 12, 2010 (KR) .................. 10-2010-0044691

(51) Int. Cl.
*B60T 8/32* (2006.01)

(52) U.S. Cl.
USPC ....................................................... 303/152

(58) Field of Classification Search
USPC .......... 303/3, 7, 15, 20, 151, 152; 701/70–72
See application file for complete search history.

(56) References Cited

U.S. PATENT DOCUMENTS

| | | | | |
|---|---|---|---|---|
| 4,962,969 A | * | 10/1990 | Davis | 303/3 |
| 5,632,534 A | * | 5/1997 | Knechtges | 303/152 |
| 6,508,523 B2 | * | 1/2003 | Yoshino | 303/152 |
| 6,598,945 B2 | * | 7/2003 | Shimada et al. | 303/152 |
| 6,691,013 B1 | * | 2/2004 | Brown | 701/70 |
| 6,957,874 B2 | * | 10/2005 | Hara et al. | 303/152 |
| 7,136,737 B2 | * | 11/2006 | Ashizawa et al. | 701/70 |
| 7,441,845 B2 | * | 10/2008 | Crombez et al. | 303/152 |
| 2007/0018499 A1 | * | 1/2007 | Kokubo et al. | 303/151 |

FOREIGN PATENT DOCUMENTS

KR 10-2008-0036778 A 4/2008

OTHER PUBLICATIONS

German Office Action, w/ English translation thereof, issued in German Patent Application No. 10 2011 100 934.9, dated Jan. 20, 2012.

* cited by examiner

*Primary Examiner* — Christopher Schwartz
(74) *Attorney, Agent, or Firm* — McDermott Will & Emery LLP

(57) ABSTRACT

Disclosed herein is a regenerative brake control method of a regenerative brake system using an electronic control brake, which is devised to increase a regenerative brake energy recovery rate of a vehicle via brake hydraulic pressure control under low brake pressure conditions. The regenerative brake control method includes determining whether or not regenerative brake cooperative control of non-drive wheels is necessary based on a vehicle speed and driver requested brake force, and selecting whether or not to perform the regenerative brake cooperative control, thereby achieving vehicle braking stability. If the regenerative brake cooperative control is necessary, brake hydraulic pressure of non-drive wheels are controlled to increase regenerative brake force of drive wheels, which increases a regenerative brake energy recovery rate.

6 Claims, 10 Drawing Sheets

REGENERATIVE BRAKE CONTROL METHOD

CROSS-REFERENCE TO RELATED APPLICATION

This application claims the benefit of Korean Patent Application No. 2010-0044691, filed on May 12, 2010 in the Korean Intellectual Property Office, the disclosure of which is incorporated herein by reference.

BACKGROUND

1. Field

Embodiments of the present invention relate to a regenerative brake control method of a regenerative brake system using an electronic control brake, which may increase a regenerative brake energy recovery rate of a vehicle via brake hydraulic pressure control under low brake pressure conditions.

2. Description of the Related Art

A regenerative brake system converts a part of kinetic energy of a wheel, emitted in the form of thermal energy during braking, into electric energy using a drive motor mounted to a drive shaft of a vehicle, allowing the energy to be reused for vehicle driving, which results in enhanced fuel economy. Thus, the regenerative brake system may need to maximize a regenerative brake energy recovery rate while achieving vehicle braking stability.

Currently, various regenerative brake systems, such as Electro Hydraulic Brake (EHB) systems, hydraulic booster systems, electronic control brake systems, and the like, are in development or in mass-production.

An Electro Hydraulic Brake (EHB) system detects driver requested brake force using a pedal stroke sensor, and generates required hydraulic brake force, which corresponds to a difference between the driver requested brake force and regenerative brake force, via pressure distribution to front and rear wheels. In the case of a 2-wheel drive (2WD) vehicle, if driver requested brake force is less than the maximum capacity of a drive motor of a vehicle at the initial braking stage, the EHB system maintains non-drive wheels (rear wheels of a Front Wheel Drive (FWD) vehicle or front wheels of a Rear Wheel Drive (RWD) vehicle) at a minimum pressure (about 5 bars), and generates hydraulic brake force using pressure of drive wheels (front wheels of an FWD vehicle or rear wheels of a RWD vehicle). Then, if the driver requested brake force becomes greater than the maximum capacity of the drive motor, the EHB system maintains or reduces the pressure of the drive wheels (front wheels of an FWD vehicle or rear wheels of a RWD vehicle) and increases the pressure of the non-drive wheels (rear wheels of an FWD vehicle or front wheels of a RWD vehicle) to generate hydraulic brake force demanded by a vehicle.

Although the regenerative brake control method using the EHB system may advantageously generate additional regenerative brake force of drive wheels by controlling pressure of non-drive wheels at the initial braking stage, generating regenerative brake force of the drive wheels using hydraulic brake force of the non-drive wheels may cause over-braking of the drive wheels at the initial braking stage under high speed conditions. This may deteriorate braking stability due to wheel slippage, or may necessitate a safety system, such as an Anti-lock Brake System (ABS), which restricts regenerative brake control and consequently, a regenerative brake energy recovery rate.

A hydraulic booster system detects driver requested brake force using a pedal stroke sensor, and generates required hydraulic brake force, which corresponds to a difference between the driver requested brake force and regenerative brake force, via simultaneous pressure control of drive wheels (front wheels of an FWD vehicle or rear wheels of a RWD vehicle) and non-drive wheels (rear wheels of an FWD vehicle or front wheels of a RWD vehicle).

To achieve the driver requested brake force by simultaneously controlling pressure of a drive shaft and a non-drive shaft during braking, the regenerative brake control method using the hydraulic booster system needs to additionally generate regenerative brake force of the drive shaft corresponding to the controlled pressure of the non-drive shaft. In this case, the drive shaft is always affected by the regenerative brake force corresponding to the controlled pressure of the non-drive shaft, thus causing over-braking of drive wheels. This may deteriorate braking stability due to wheel slippage when braking at high speed, or may necessitate a safety system, such as an ABS, which restricts regenerative brake control and consequently, a regenerative brake energy recovery rate, similar to the regenerative brake control method using the EHB system.

In regenerative brake control using an electronic control brake system, only brake pressure of a drive shaft which functions to generate regenerative brake force is controlled, which enables distribution of brake force to front and rear wheels in the same manner as a conventional brake system. In this case, since controlling only brake pressure of the drive shaft is possible if driver requested brake force is less than the maximum capacity of a drive motor of a vehicle (regenerative braking at low brake pressure), maximum regenerative brake force of the vehicle is the level of input brake force of drive wheels at the most, in particular, in a middle or low speed section, which may limit a regenerative brake energy recovery rate.

As described above, electric vehicles and hybrid vehicles using regenerative brake energy may exhibit a limited recovery brake energy recovery rate because brake force is less than the maximum capacity of a drive motor of a vehicle in most situations.

SUMMARY

Therefore, it is an aspect of the present invention to provide a regenerative brake control method of a regenerative brake system using an electronic control brake system of a 2WD vehicle, which may achieve braking stability at high speed and increase a regenerative brake energy recovery rate at middle or low speed.

Additional aspects of the invention will be set forth in part in the description which follows and, in part, will be obvious from the description, or may be learned by practice of the invention.

In accordance with one aspect of the present invention, a regenerative brake control method includes calculating maximum regenerative brake force of a drive motor according to a vehicle speed upon braking, calculating driver requested brake force based on vehicle information upon braking, judging whether or not regenerative brake cooperative control of a non-drive wheel is necessary based on the vehicle speed and the driver requested brake force, controlling hydraulic brake force of the non-drive wheel upon judging that the regenerative brake cooperative control of the non-drive wheel is necessary, and additionally generating regenerative brake force of a drive wheel corresponding to the hydraulic brake force of the non-drive wheel.

The judgment of necessity of the regenerative brake cooperative control of the non-drive wheel may include judging whether or not the maximum regenerative brake force of the drive motor exceeds a controllable maximum hydraulic pressure of the drive wheel after hydraulic pressure of the drive wheel is controlled at an initial braking stage.

The hydraulic brake force of the non-drive wheel may be controlled to increase the regenerative brake force of the drive wheel if the maximum regenerative brake force of the drive motor exceeds the controllable maximum hydraulic pressure of the drive wheel.

In the case of a front-wheel-drive vehicle, hydraulic brake force of a rear wheel may be controlled to increase regenerative brake force of a front wheel.

In the case of a rear-wheel-drive vehicle, hydraulic brake force of a front wheel is controlled to increase regenerative brake force of a rear wheel.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
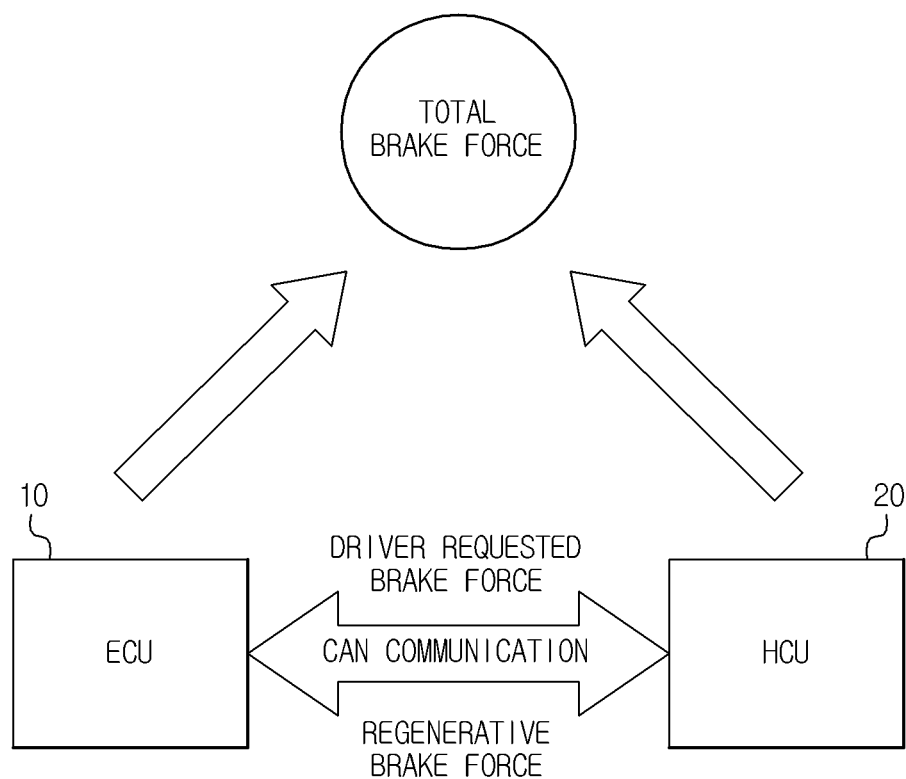
FIG. 1 is a conceptual view of a regenerative brake system according to an embodiment of the present invention.

Reference will now be made in detail to the embodiment of the present invention, examples of which are illustrated in the accompanying drawings, wherein like reference numerals refer to like elements throughout.

FIG. 1 is a conceptual view of a regenerative brake system according to an embodiment of the present invention.

In FIG. 1, the regenerative brake system according to the embodiment of the present invention includes a hydraulic brake control unit (i.e. Engine Control Unit (ECU)) 10 and a Hybrid Control Unit (HCU) 20. The ECU 10 calculates driver requested brake force using master pressure or pedal stroke and performs hydraulic pressure control to generate brake hydraulic pressure corresponding to a difference between the driver requested brake force (total brake force) and regenerative brake force (i.e. regenerative brake torque). The HCU 20 performs regenerative brake control to generate regenerative brake torque by an electric motor to rotate wheels FL, RR, RL and FR of a vehicle using electric energy. The HCU 20 transmits a value of the regenerative brake force to the ECU 10.

The ECU 10 and the HCU 20 transmit information via CAN communication.

Figure 2:
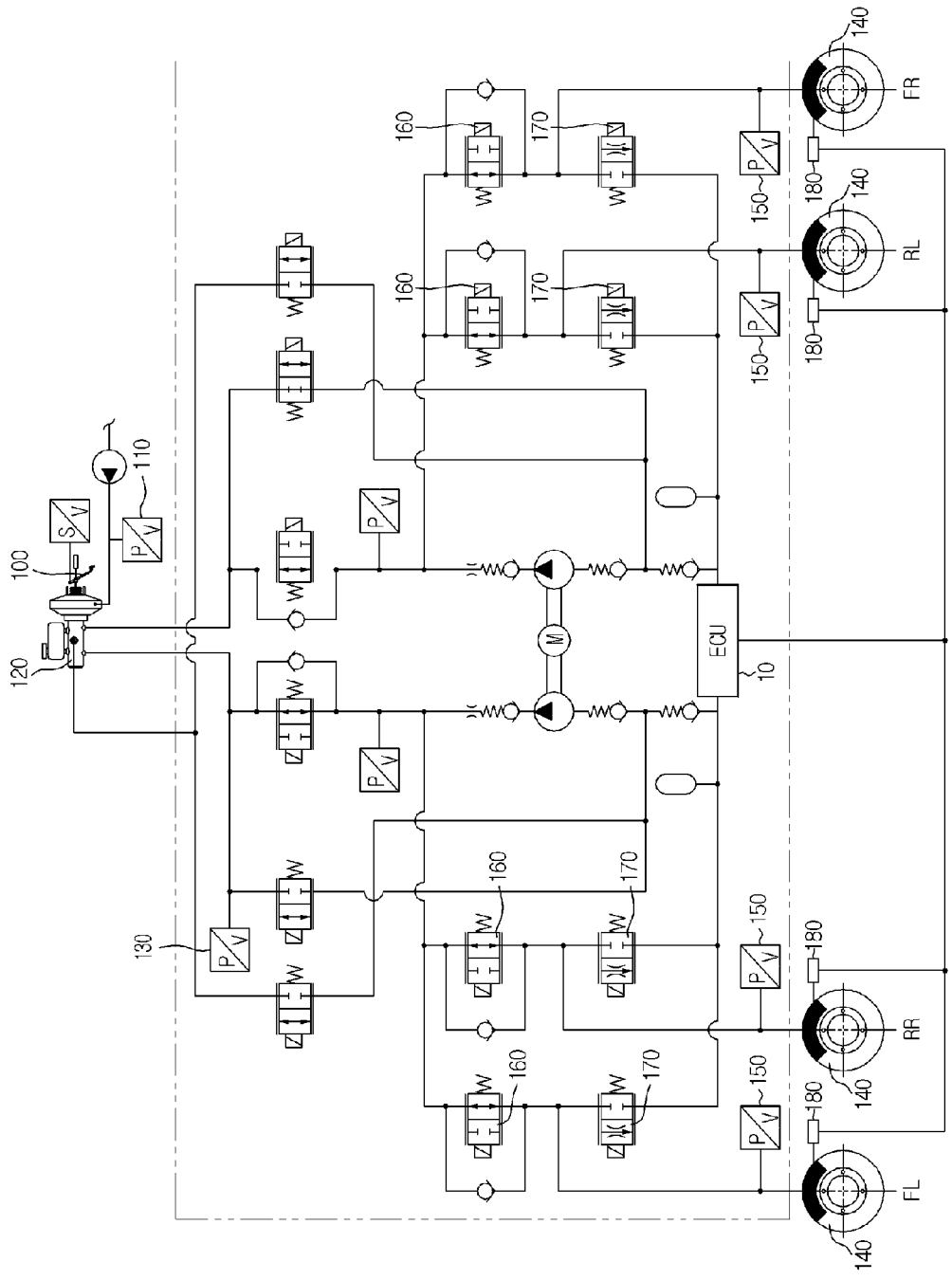
FIG. 2 is a hydraulic control circuit diagram of the regenerative brake system according to the embodiment of the present invention.

FIG. 2 is a hydraulic control circuit diagram of the regenerative brake system according to the embodiment of the present invention.

In FIG. 2, a hydraulic control device of the regenerative brake system according to the embodiment of the present invention includes a pedal stroke sensor 110 to sense an operation rate of a brake pedal 100, i.e. driver requested brake force, a master cylinder 120 to apply brake hydraulic pressure by operation of the brake pedal 100 so as to operate a brake, a master pressure sensor 130 to sense pressure of the master cylinder 120 (hereinafter, referred to as master pressure) which is changed based on driver braking intention, wheel pressure sensors 150 installed to the respective wheels FL, RR, RL and FR to sense actual brake pressure (hereinafter, referred to as wheel pressure) applied to wheel cylinders 140, a plurality of entrance valves 160 and exit valves 170 provided at entrances and exits of the wheel cylinders 140 to transmit brake pressure, wheel speed sensors 180 installed to the respective wheels FL, RR, RL, FR to sense a vehicle speed, and the ECU 10 to control opening/closing operation of the plurality of entrance valves 160 and exit valves 170.

The ECU 10 receives the value of the regenerative brake force obtained by the electric motor from the HCU 20 via CAN communication, and senses the driver requested brake force from the pedal stroke sensed by the pedal stroke sensor 110 or the master pressure sensed by the master pressure sensor 130. Thereafter, the ECU 10 performs hydraulic pressure control to generate hydraulic brake force, which corresponds to a difference between the sensed driver requested brake force (total brake force) and the regenerative brake force corresponding to regenerative brake torque. In this case, the ECU 10 calculates target wheel pressure based on the hydraulic brake force which corresponds to a difference between the total brake force and the regenerative brake force, and adjusts the master pressure to the target wheel pressure. The target wheel pressure is brake pressure to be equally applied to all of the wheels FL, RR, RL and FR, and serves to adjust hydraulic brake force to be transmitted to the respective wheel cylinders 140.

The ECU 10 determines whether or not regenerative brake cooperative control of non-drive wheels is necessary based on a vehicle speed and driver requested brake force, and selects whether or not to perform the regenerative brake cooperative control, thereby achieving vehicle braking stability. If the regenerative brake cooperative control is necessary, the ECU 10 increases regenerative brake force of drive wheels via brake pressure control by controlling brake hydraulic pressure of non-drive wheels, thereby increasing a regenerative brake energy recovery rate.

In the case of an FWD vehicle, the ECU 10 determines whether or not regenerative brake cooperative control of rear wheels as non-drive wheels is necessary based on a vehicle speed and driver requested brake force, and selects whether or not to perform the regenerative brake cooperative control, thereby achieving vehicle brake stability. If the regenerative brake cooperative control is necessary, the ECU 10 increases regenerative brake force of front wheels via brake pressure control by controlling brake hydraulic pressure of the rear wheels, thereby increasing a regenerative brake energy recovery rate.

In the case of a RWD vehicle, the ECU 10 determines whether or not regenerative brake cooperative control of front wheels as non-drive wheels is necessary based on a vehicle speed and driver requested brake force, and selects whether or not to perform the regenerative brake cooperative control, thereby achieving vehicle brake stability. If the regenerative brake cooperative control is necessary, the ECU 10 increases regenerative brake force of rear wheels via brake pressure control by controlling brake hydraulic pressure of the front wheels, thereby increasing a regenerative brake energy recovery rate.

Hereinafter, operation and effects of the regenerative brake control method using the above described brake system will be described.

The amount of regenerative brake energy of an electric vehicle and a hybrid vehicle depends on a capacity of a drive motor, and regenerative brake torque of the drive motor may be calculated by the following Equation 1 using a relation between Revolutions Per Minute (RPM) of the motor and power P of the motor.

$$P = T \times \omega \ (T{:}\text{Torque}, \omega{:}\text{angular speed}) \quad \text{Equation 1}$$

The following Equation 2 shows results of applying conversion expressions to Equation 1.

$$\omega = \text{motor RPM} \times \pi/30 (\text{rad}/s)$$

$$1 \text{ RPM} = 2\pi/60 (\text{rad}/s)$$

$$P(kw) = T(Nm) \times \text{motor RPM} \times /30(\text{rad}/s) \times (1/1000)(kNm/Nm) \quad \text{Equation 2}$$

In Equation 2, the motor has a fixed capacity and therefore, it will be appreciated that regenerative brake torque of the motor is inversely proportional to motor RPM. The maximum regenerative brake torque of the motor can be calculated using the motor RPM calculated from the measured vehicle speed and longitudinal reduction gear ratio and torque of a drive shaft can be calculated using the torque of the motor and the longitudinal reduction gear ratio. Thus, maximum regenerative brake torque of the motor based on a vehicle speed and the torque of the drive shaft can be calculated.

Figure 3:
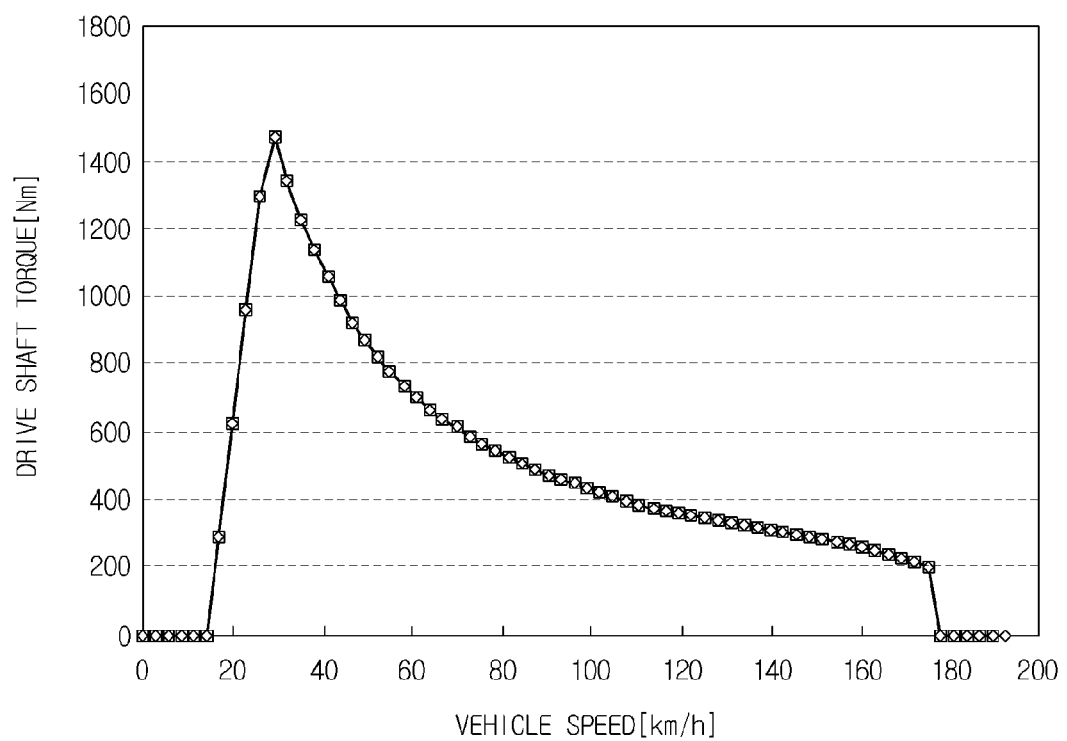
FIG. 3 is a graph illustrating a relation between vehicle speed and maximum regenerative torque.

A relation between the vehicle speed and the maximum regenerative brake torque using Equation 1 and Equation 2 is illustrated in FIG. 3.

FIG. 3 is a graph illustrating a relation between vehicle speed and maximum regenerative brake torque, and drive shaft torque of the ordinate is determined by the capacity of the motor.

Figure 4:
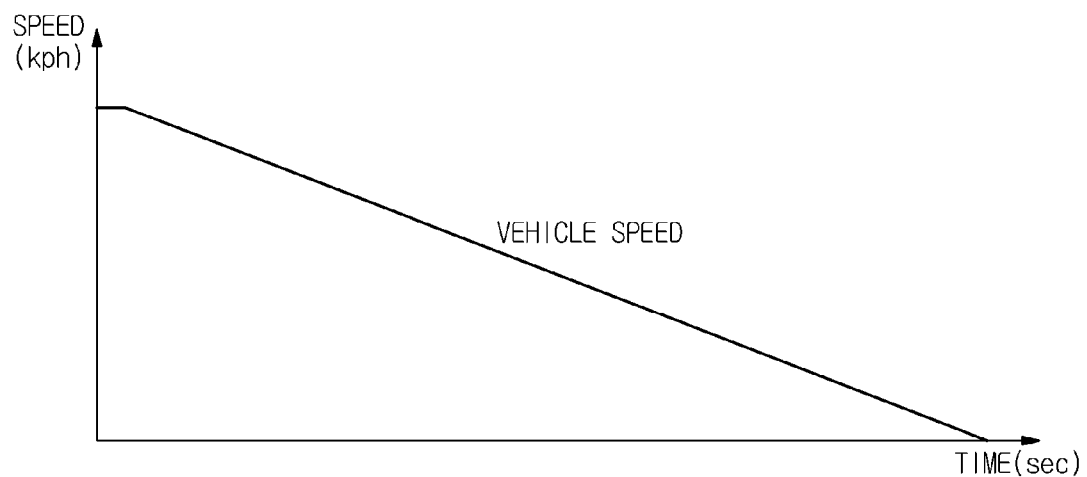
FIG. 4 is a profile illustrating a vehicle speed under low brake pressure conditions of the regenerative brake system using an electronic control brake system of a 2WD vehicle.
Figure 5:
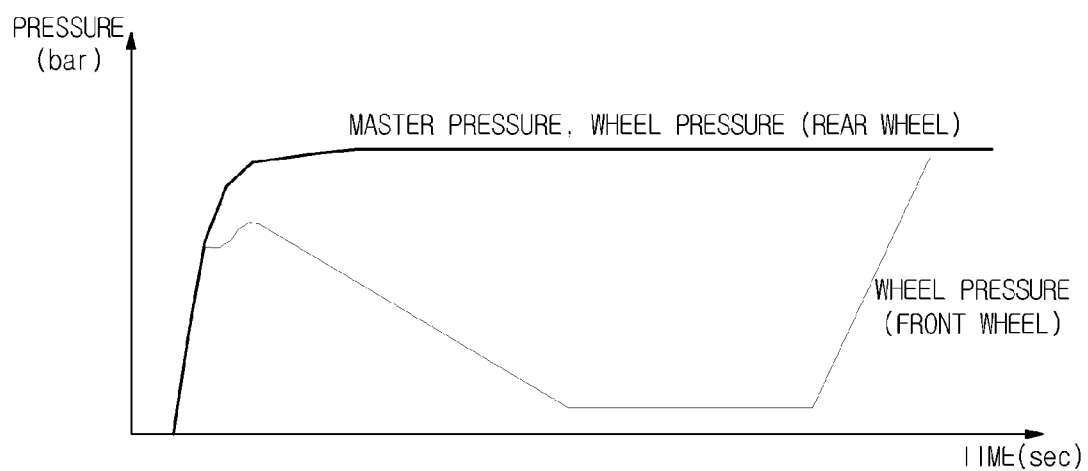
FIG. 5 is a profile illustrating brake hydraulic pressure under low brake pressure conditions of the regenerative brake system using an electronic control brake system of a 2WD vehicle.
Figure 6:
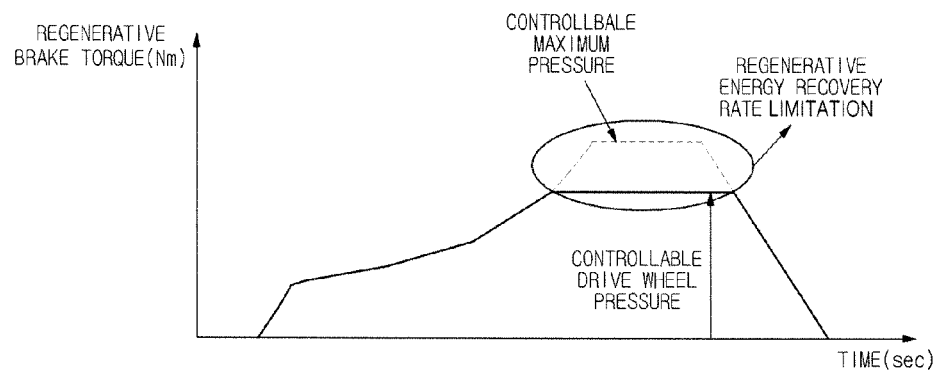
FIG. 6 is a profile illustrating regenerative brake torque under low brake pressure conditions of the regenerative brake system using an electronic control brake system of a 2WD vehicle.

FIGS. 4 to 6 illustrate profiles of vehicle speed, brake hydraulic pressure, and regenerative brake torque under low brake pressure conditions of a regenerative brake cooperative control system using the electronic control brake system of a FWD vehicle.

FIG. 4 is a profile illustrating vehicle speed under low brake pressure conditions of the regenerative brake system using an electronic control brake system of a 2WD vehicle, FIG. 5 is a profile illustrating brake hydraulic pressure under low brake pressure conditions of the regenerative brake system using an electronic control brake system of a 2WD vehicle, and FIG. 6 is a profile illustrating regenerative brake torque under low brake pressure conditions of the regenerative brake system using an electronic control brake system of a 2WD vehicle.

As illustrated in FIGS. 4 to 6, when regenerative brake control begins under low brake pressure conditions, the electronic control brake system may distribute brake force to front and rear wheels in the same manner as a conventional brake system, but controls only brake pressure of a drive shaft which functions to generate regenerative brake force if driver requested brake force is equal to or less than the maximum capacity of a drive motor of a vehicle. In this case, maximum regenerative brake force of the vehicle is the level of input brake force of the drive shaft at the most, in particular, in a middle or low speed section, resulting in a limited regenerative brake energy recovery rate.

Thus, the embodiment of the present invention attempt to prevent over-braking at high speed braking condition of the EHB system and hydraulic booster system and to prevent deterioration of a regenerative brake energy recovery rate under low brake pressure conditions of the electronic control brake system.

As will be appreciated from FIGS. 3 to 6, in a high-speed section (a section in which the drive motor operates at high RPM), low regenerative brake torque is generated at the same power P of the motor based on Equation 1. The regenerative brake torque at the same power P of the motor is increased toward a low-speed section.

Thus, in a method to increase a regenerative brake energy recovery rate according to the embodiment of the present invention, brake hydraulic pressure cooperative control based on regenerative brake torque at the initial braking stage (in a high-speed section) allows regenerative brake cooperative control to generate regenerative brake energy corresponding to hydraulic brake force of drive wheels and achieves vehicle braking stability to prevent over-braking of the drive wheels by controlling the hydraulic brake force of the drive wheels. Subsequently, if the maximum capacity of a drive motor of a vehicle exceeds a controllable maximum hydraulic pressure of the drive wheels after the middle braking stage (in a middle or low speed section), hydraulic brake force of non-drive wheels is controlled to increase regenerative brake force of drive wheels.

The above-described method may be performed in two manners.

First, in the case of regenerative brake cooperative control of an FWD vehicle, if possible regenerative brake force of a drive motor exceeds a controllable hydraulic pressure of front wheels after hydraulic pressure of the front wheels is controlled at the initial braking stage, hydraulic pressure of rear wheels is additionally controlled and regenerative brake force of the front wheels corresponding to the controlled hydraulic pressure of the rear wheels is additionally generated.

Next, in the case of regenerative brake cooperative control of a RWD vehicle, if a possible regenerative brake force of a drive motor exceeds a controllable hydraulic pressure of rear wheels after hydraulic pressure of the rear wheels is controlled at the initial braking stage, hydraulic pressure of front wheels is additionally controlled and regenerative brake force of the front wheels corresponding to the controlled hydraulic pressure of the front wheels is additionally generated.

FIGS. 7 to 10 illustrate profiles of brake hydraulic pressure and regenerative brake torque using the regenerative brake cooperative control method under low brake pressure conditions of a 2WD vehicle.

Figure 7:
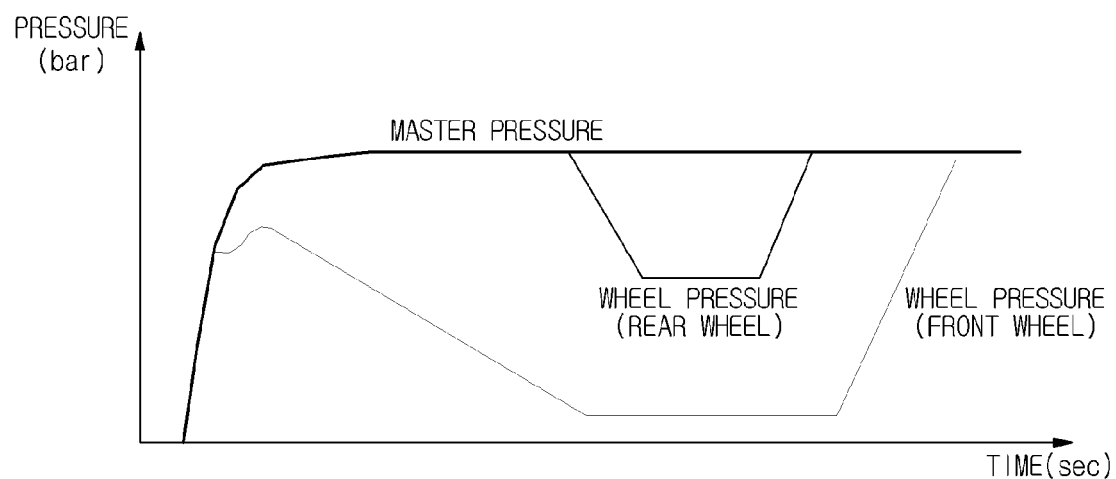
FIG. 7 is a profile illustrating brake hydraulic pressure under low brake pressure conditions of front-wheel centered regenerative brake cooperative control of a 2WD vehicle according to the embodiment of the present invention.
Figure 8:
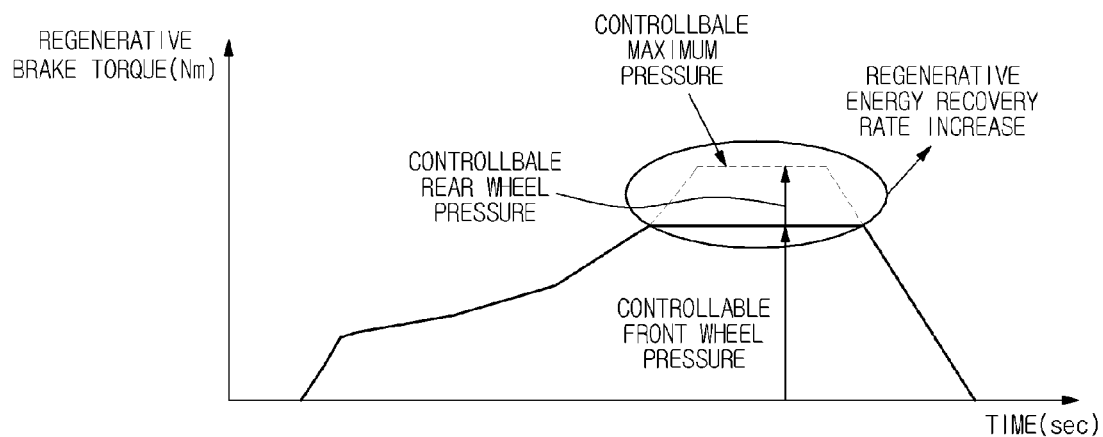
FIG. 8 is a profile illustrating regenerative brake torque under low brake pressure conditions of front-wheel centered regenerative brake cooperative control of a 2WD vehicle according to the embodiment of the present invention.

FIG. 7 is a profile illustrating brake hydraulic pressure under low brake pressure conditions of front-wheel centered regenerative brake cooperative control of a 2WD vehicle according to the embodiment of the present invention, and FIG. 8 is a profile illustrating regenerative brake torque under low brake pressure conditions of front-wheel centered regenerative brake cooperative control of a 2WD vehicle according to the embodiment of the present invention.

Figure 9:
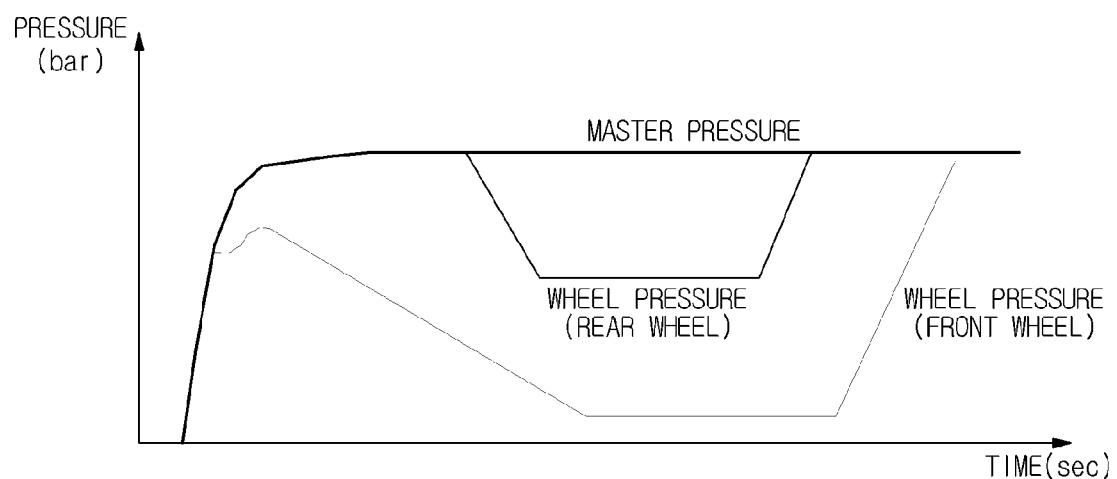
FIG. 9 is a profile illustrating brake hydraulic pressure under low brake pressure conditions of rear-wheel centered regenerative brake cooperative control of a 2WD vehicle according to the embodiment of the present invention.
Figure 10:
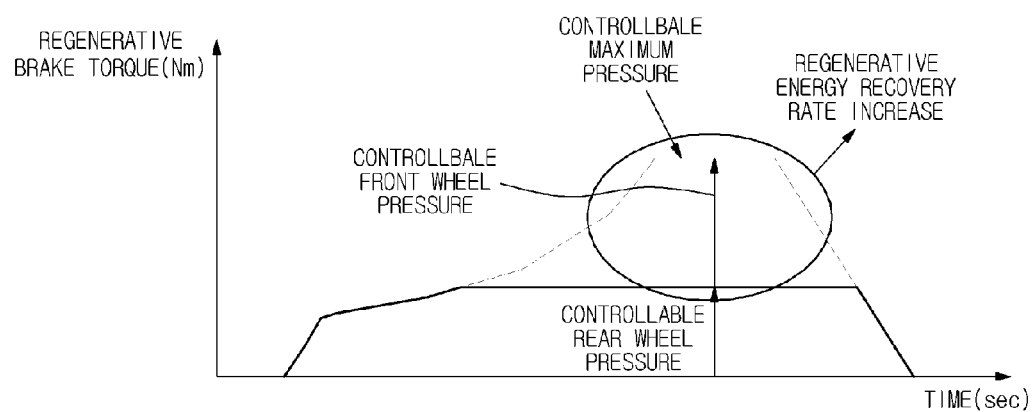
FIG. 10 is a profile illustrating regenerative brake torque under low brake pressure conditions of rear-wheel centered regenerative brake cooperative control of a 2WD vehicle according to the embodiment of the present invention.

FIG. 9 is a profile illustrating brake hydraulic pressure under low brake pressure conditions of rear-wheel centered regenerative brake cooperative control of a 2WD vehicle according to the embodiment of the present invention, and FIG. 10 is a profile illustrating regenerative brake torque under low brake pressure conditions of rear-wheel centered regenerative brake cooperative control of a 2WD vehicle according to the embodiment of the present invention.

As will be appreciated from FIGS. 7 to 10, brake hydraulic pressure cooperative control based on regenerative brake torque at the initial braking stage (in a high-speed section) allows regenerative brake cooperative control to generate regenerative brake energy corresponding to hydraulic brake force of drive wheels and achieves vehicle braking stability to prevent over-braking of the drive wheels by controlling the hydraulic brake force of the drive wheels. Subsequently, if the maximum capacity of a drive motor of a vehicle exceeds a controllable maximum hydraulic pressure of the drive wheels after the middle braking stage (in a middle or low speed section), hydraulic brake force of non-drive wheels is controlled to increase regenerative brake force of drive wheels so as to increase a regenerative brake energy recovery rate. This achieves vehicle braking stability and maximizes regenerative brake energy recovery efficiency.

As is apparent from the above description, a regenerative brake system using an electronic control brake system of a 2WD vehicle according to the embodiment of the present invention may achieve vehicle brake stability in a high speed section and maximize a regenerative brake energy recovery rate in a middle or low speed section.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A regenerative brake control method comprising:
   calculating a maximum regenerative brake force of a drive motor according to a vehicle speed upon braking;
   calculating driver requested brake force based on vehicle information upon braking;
   judging whether or not regenerative brake cooperative control of a non-drive wheel is necessary based on the vehicle speed and the driver requested brake force; and
   controlling hydraulic brake force of the non-drive wheel to control regenerative brake force of a drive wheel upon judging that the regenerative brake cooperative control of the non-drive wheel is necessary.

2. The method according to claim 1, wherein the judgment of necessity of the regenerative brake cooperative control of the non-drive wheel includes judging whether or not the maximum regenerative brake force of the drive motor exceeds a controllable maximum hydraulic pressure of the drive wheel after hydraulic pressure of the drive wheel is controlled at an initial braking stage.

3. The method according to claim 2, wherein the hydraulic brake force of the non-drive wheel is controlled to increase the regenerative brake force of the drive wheel if the maximum regenerative brake force of the drive motor exceeds the controllable maximum hydraulic pressure of the drive wheel.

4. The method according to claim 3, wherein hydraulic brake force of a rear wheel is controlled to increase regenerative brake force of a front wheel in the case of a front-wheel-drive vehicle.

5. The method according to claim 3, wherein hydraulic brake force of a front wheel is controlled to increase regenerative brake force of a rear wheel in the case of a rear-wheel-drive vehicle.

6. The method according to claim 1, wherein the hydraulic brake force of the non-drive wheel is controlled to increase the regenerative brake force of the drive wheel.

* * * * *